(12) United States Patent
Mihm et al.

(10) Patent No.: US 9,932,004 B1
(45) Date of Patent: Apr. 3, 2018

(54) VEHICLE ENERGY ABSORPTION SYSTEM

(71) Applicant: Honda Motor Co., Ltd., Tokyo (JP)

(72) Inventors: Adam M. Mihm, Dublin, OH (US); Yuta Kashiwase, Dublin, OH (US); Lando C. Hamlett, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/448,331

(22) Filed: Mar. 2, 2017

(51) Int. Cl.
*B60R 19/04* (2006.01)
*B60R 19/34* (2006.01)

(52) U.S. Cl.
CPC .............. *B60R 19/04* (2013.01); *B60R 19/34* (2013.01)

(58) Field of Classification Search
CPC ................................ B60R 19/04; B60R 19/34
USPC .......................................................... 293/117
See application file for complete search history.

(56) References Cited

U.S. PATENT DOCUMENTS

| | | | |
|---|---|---|---|
| 6,971,692 B2 | 12/2005 | Gioia et al. | |
| 7,201,412 B2 | 4/2007 | Kashiwagi et al. | |
| 7,661,735 B2 | 2/2010 | Roussel et al. | |
| 7,699,383 B2 | 4/2010 | Fukukawa et al. | |
| 7,740,293 B2 | 6/2010 | Kim | |
| 7,959,197 B2 | 6/2011 | Agrahari et al. | |
| 8,196,979 B2 | 6/2012 | Ralston et al. | |
| 8,991,860 B2 * | 3/2015 | Kim | B60R 19/205 280/762 |
| 9,096,272 B2 | 8/2015 | Miyamoto et al. | |
| 2016/0137158 A1 | 5/2016 | Du et al. | |

FOREIGN PATENT DOCUMENTS

| | | |
|---|---|---|
| CN | 101462531 A | 6/2009 |
| CN | 102196947 A | 9/2011 |
| CN | 202243325 U | 5/2012 |
| CN | 102897137 A | 1/2013 |
| CN | 202793042 U | 3/2013 |
| CN | 103287381 A | 9/2013 |
| CN | 203294056 U | 11/2013 |
| CN | 205239661 U | 5/2016 |
| WO | 03072399 A2 | 9/2003 |
| WO | 2010069454 A1 | 6/2010 |

* cited by examiner

*Primary Examiner* — Joseph D. Pape
(74) *Attorney, Agent, or Firm* — Kenealy Vaidya LLP

(57) ABSTRACT

A sensor bracket assembly is configured to extend between a sensor beam and a bumper beam of a vehicle. The sensor bracket assembly can include a bracket first section that is configured to be directly or indirectly connected to the bumper beam. The sensor bracket assembly can also include a bracket second section that is configured to be directly or indirectly connected to the sensor beam. The sensor bracket assembly can further include a spacer section that projects from the bracket first section and is configured to extend towards but be spaced from one of the bracket second section and the bumper beam.

19 Claims, 14 Drawing Sheets

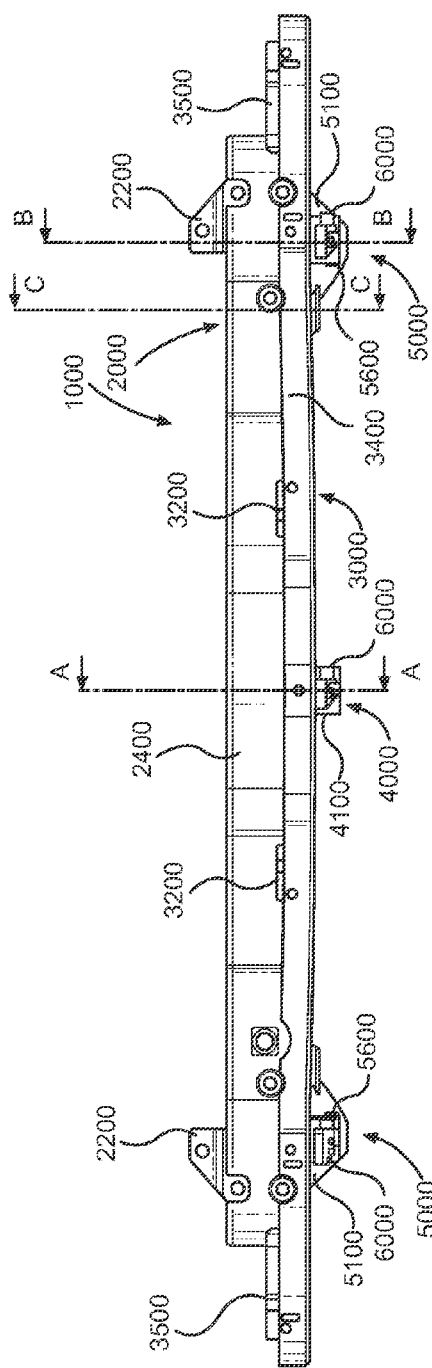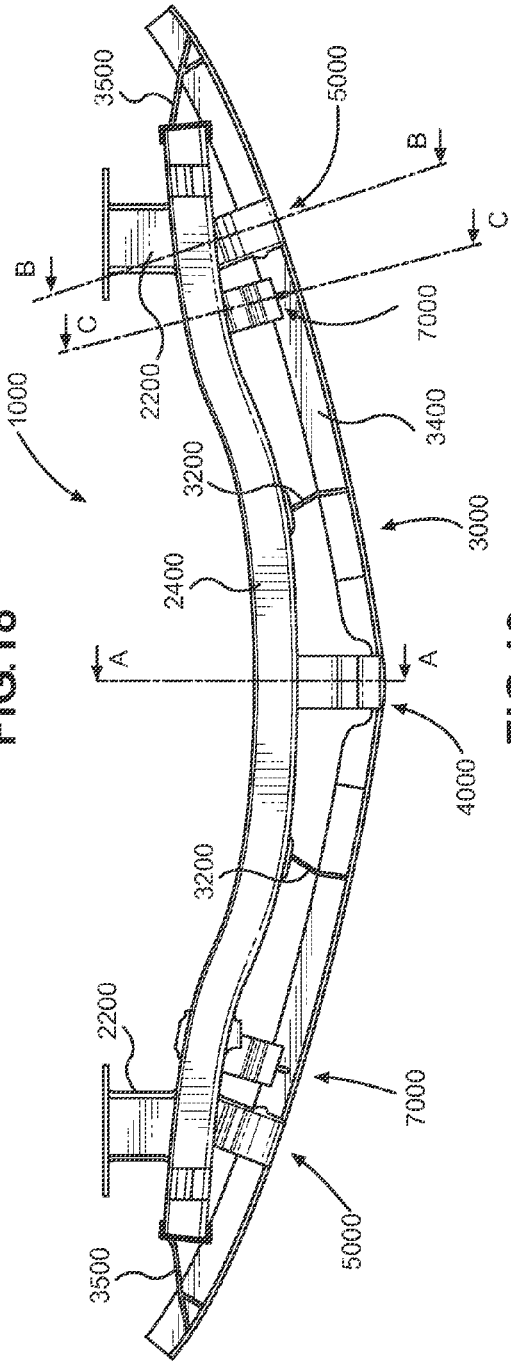

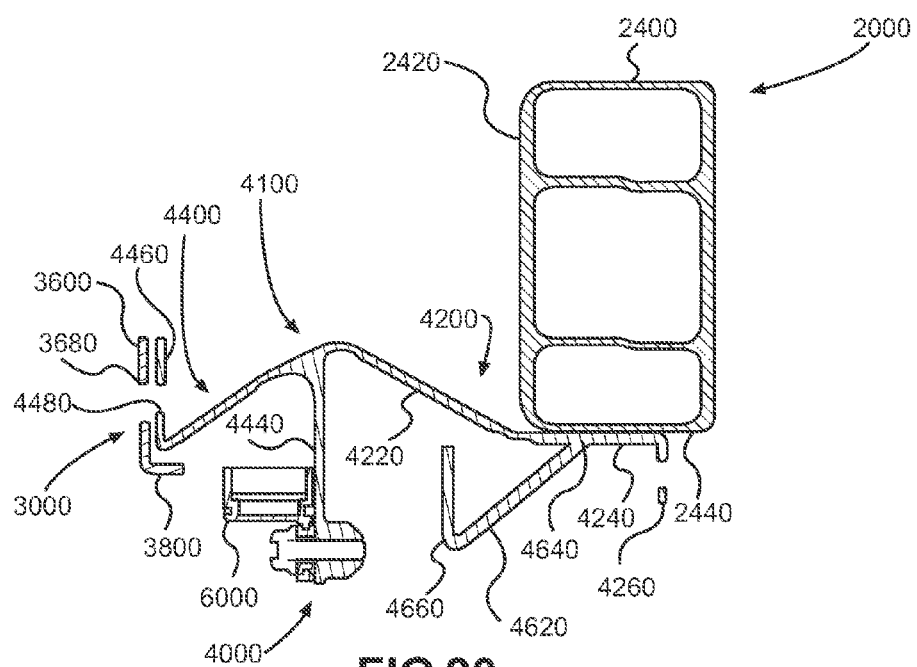
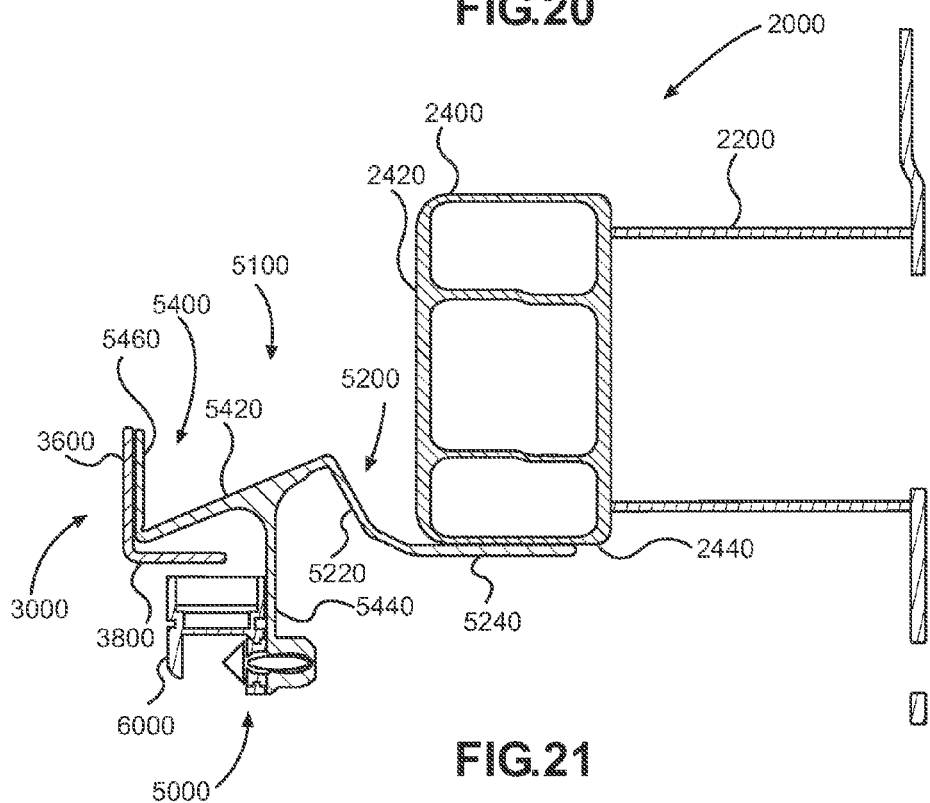

VEHICLE ENERGY ABSORPTION SYSTEM

BACKGROUND

Energy absorption systems of vehicles, particularly bumper systems with deformable brackets that can absorb energy to decrease impact forces during a collision, promote enhanced safety during operation of the vehicle by mitigating damage to foreign objects that collide with the vehicle. Thin walled metal plates (i.e., steel, aluminum), expanded foam, and other plastic absorbers including ribbed structures, thermo-formed and blow molded parts yield energy absorption to lessen collision impact forces while maintaining structural rigidity of the bumper system. Such methods of forming bracket parts can lead to easily and unevenly deforming parts, causing peaks in collision forces experienced by the foreign object as easily deformable parts are crushed against nondeforming parts such as a bumper beam.

A need was identified for a vehicle energy absorption system having a force deflection curve resembling a more efficient "square wave" that increases a reaction force immediately after an initial buckling phase of the deformable parts.

SUMMARY

According to one aspect, a sensor bracket assembly is configured to extend between a sensor beam and a bumper beam of a vehicle. The sensor bracket assembly can include a bracket first section that is configured to be directly or indirectly connected to the bumper beam. The sensor bracket assembly can also include a bracket second section that is configured to be directly or indirectly connected to the sensor beam. The sensor bracket assembly can further include a spacer section that projects from the bracket first section and is configured to extend towards but be spaced from one of the bracket second section and the bumper beam.

According to another aspect, a sensor bracket combination is configured to extend between a sensor beam and a bumper beam of a vehicle. The sensor bracket combination can include a first bracket member. The first bracket member can have a first bracket first section that is configured to be directly or indirectly connected to the bumper beam. The first bracket member can also have a first bracket second section that is configured to be directly or indirectly connected to the sensor beam. The first bracket member can further have a first spacer section that projects from the first bracket first section and is configured to extend towards but be spaced from one of the first bracket second section and the bumper beam. The sensor bracket combination can also include at least one second bracket member. The at least one second bracket member can have a second bracket first section that is configured to be directly or indirectly connected to the bumper beam. The at least one second bracket member can also have a second bracket second section that is configured to be directly or indirectly connected to the sensor beam.

According to yet another aspect, a sensor bracket combination is configured to extend between a sensor beam and a bumper beam of a vehicle. The sensor bracket combination can be configured to extend between a sensor beam and a bumper beam of a vehicle. The sensor bracket combination can include a first bracket member. The first bracket member can include a first bracket first section that is configured to be directly or indirectly connected to the bumper beam. The first bracket member can also include a first bracket second section that is configured to be directly or indirectly connected to the sensor beam. The first bracket member can further include a first spacer section that projects from the first bracket first section and is configured to extend towards but be spaced from the first bracket second section. The sensor bracket combination can also include at least one second bracket member. The at least one second bracket member can include a second bracket first section that is configured to be directly or indirectly connected to the bumper beam. The at least one second bracket member can also include a second bracket second section that is configured to be directly or indirectly connected to the sensor beam. The sensor bracket combination can further include at least one third bracket member. The at least one third bracket member can include a third bracket first section that is configured to be directly or indirectly connected to the bumper beam. The at least one third bracket member can also include a third bracket second section that projects from the third bracket first section and is configured to extend towards but be spaced from the sensor beam.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 18 is a front perspective view of the energy absorption system of FIG. 14.

FIG. 19 is a top perspective view of the energy absorption system of FIG. 14.

FIG. 20 is an enlarged cross-section view A-A of one of the sensor brackets of FIG. 19.

FIG. 21 is an enlarged cross-section view B-B of another of the sensor brackets of FIG. 19.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overview & Cooperative Systems

The disclosed energy absorption system incorporates a two-stage energy absorbing bumper beam sensor bracket to efficiently manage acceleration/deceleration of an object such as a pedestrian's leg when impacted with an automotive energy absorption system as a result of a collision. A first stage of energy absorption is generated by initial loading of the energy absorbing bracket, and the second stage of energy absorption is generated by an additional bracket lobe which has a predetermined gap with its reaction surface. The predetermined gap ensures the additional bracket lobe contributes zero reaction force during the first stage of energy absorption. However, when the initial loading of the energy absorbing bracket occurs and the bracket begins to buckle, the predetermined gap closes. When the predetermined gap is closed, the additional bracket lobe is then loaded and the second stage of energy absorption begins. The additional bracket lobe maintains substantially the deceleration forces (i.e., Gs) from the first stage throughout the remainder of the collision event.

The exemplary energy absorbing structure can include a series of aluminum extrusions welded to the front bumper beam of a vehicle. As described above, this energy absorbing structure serves to absorb impact energy to limit the deceleration forces of an object such as a pedestrian's leg, and to transfer a G-signal to a series of sensors mounted to the structure. When a requisite G-signal is received by the sensors, a supplemental restraint system (SRS) of the vehicle can deploy a pop-up hood system to partially lift the hood (also called the bonnet). This hood system can lift the hood to provide additional crush space (i.e., as a crumple zone) to rigid engine bay components in the event of impact between a pedestrian and the hood.

II. Energy Absorption System

Figure 1:
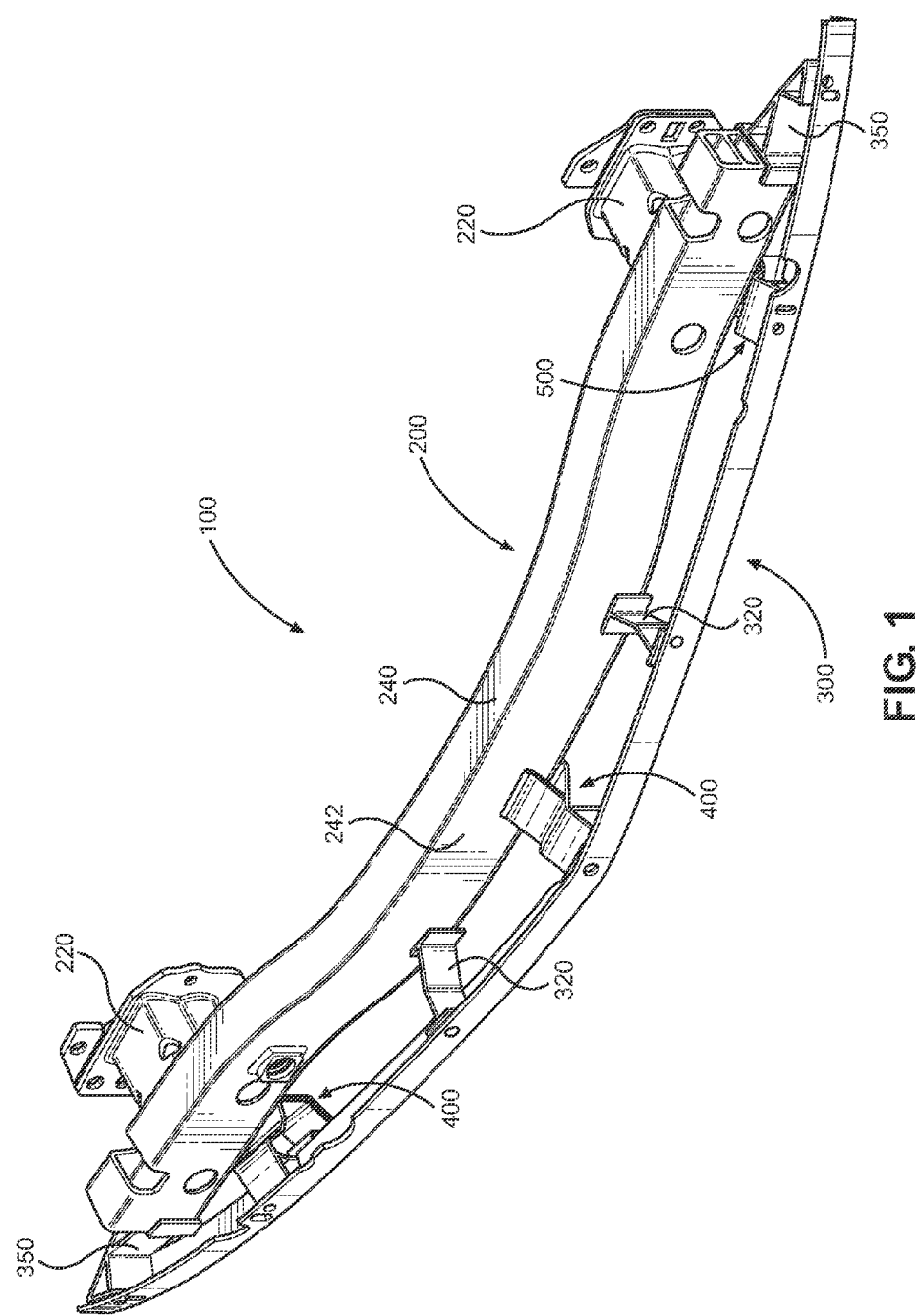
FIG. 1 is a perspective view of an exemplary energy absorption system of a vehicle in accordance with the disclosed subject matter including sensor brackets.
Figure 4:
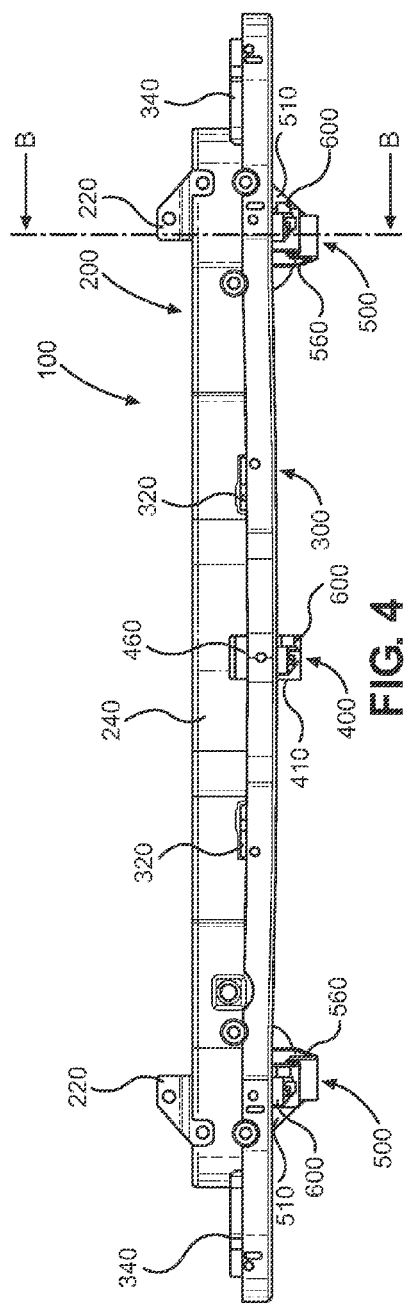
FIG. 4 is a front perspective view of the energy absorption system of FIG. 1.
Figure 5:
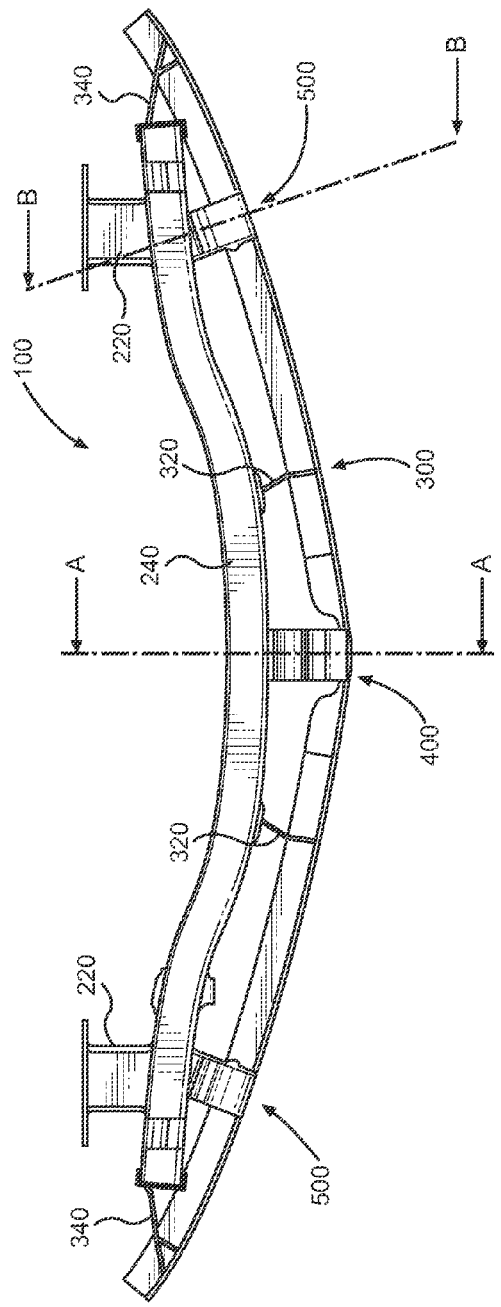
FIG. 5 is a top perspective view of the energy absorption system of FIG. 1.

FIGS. 1, 4 and 5 are perspective views of an exemplary energy absorption system 100 of a vehicle in accordance with the disclosed subject matter including sensor brackets 400,500. The exemplary energy absorption system 100 can include a bumper beam assembly 200 with a pair of crush cans 220 configured for mounting to a vehicle as a main bumper beam with a sensor bracket assembly 300 extending along and in front of the bumper beam assembly 200. The sensor bracket assembly 300 can include an elongated beam (sensor beam) 340, a pair of intermediate support brackets 320 at two intermediate locations and a pair of end support brackets 350 at opposing ends thereof for connecting to the bumper beam assembly 200. The sensor bracket assembly 300 can also include energy absorbing devices configured as the sensor brackets 400,500 extending between the beam 340 and the bumper beam assembly 200. Specifically, the sensor brackets 400,500 of the present embodiment can be secured to a beam bottom surface 244 of the bumper beam assembly 200. However, other embodiments of the energy absorption system 100 can include the sensor brackets 400,500 secured to other surfaces of the bumper beam assembly 200, or alternatively to other structures altogether.

The present embodiment shown in FIGS. 1, 4 and 5 includes three energy absorbing devices in a configuration of one sensor bracket 400 disposed at a substantially central portion of the energy absorption system 100 between the bumper beam assembly 200 and the beam 340, and a pair of the sensor brackets 500 on either side of the sensor bracket 400 at intermediate portions of the energy absorption system 100. However, other embodiments can include any number and configuration of the sensor brackets 400,500, such as one of each bracket structure, two of each bracket structure, two of the sensor brackets 400 and one sensor bracket 500, etc.

Figure 2:
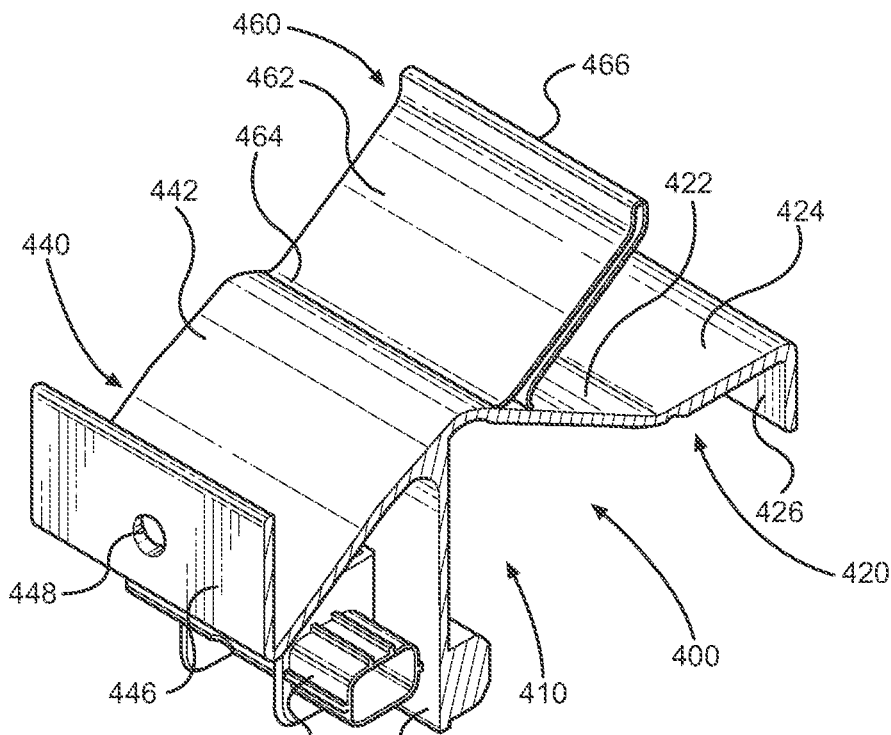
FIG. 2 is an enlarged perspective view of one of the sensor brackets of FIG. 1.
Figure 3:
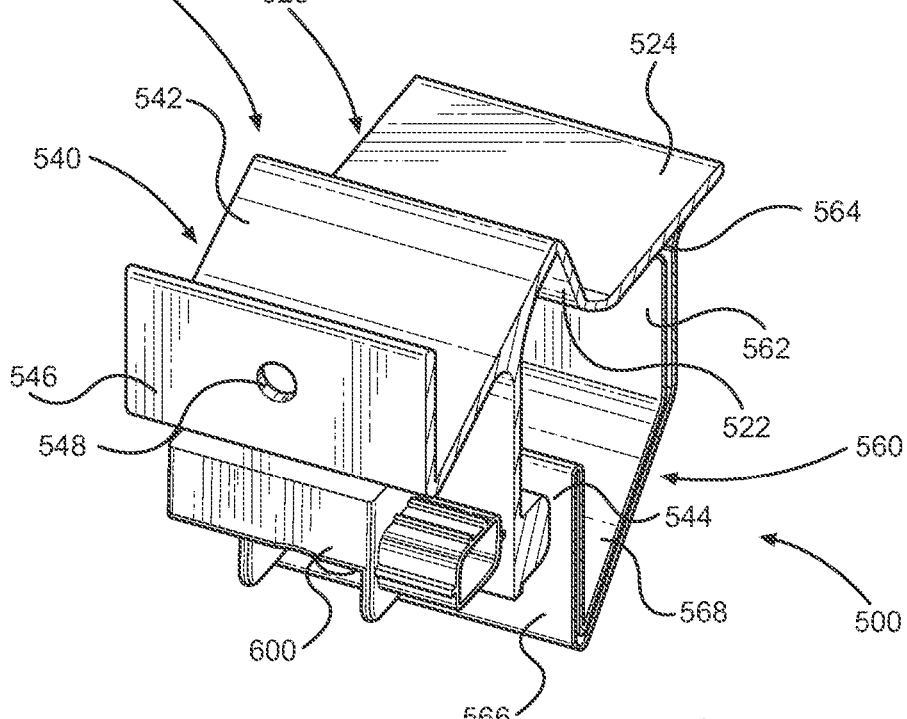
FIG. 3 is an enlarged perspective view of another of the sensor brackets of FIG. 1.

The energy absorption system 100 can include one or more sensors 600, shown in FIGS. 2 and 3, integrated therein to detect at least collisions of foreign objects such as pedestrians with the energy absorption system 100. In some embodiments, the sensor(s) 600 may detect contact with the energy absorption system 100, while other embodiments may include the sensor(s) 600 being capable of detecting proximity to the energy absorption system 100. As will be described below, the sensor(s) 600 may function in concert with other vehicle systems such as a hood pop up system that raises a hood of a vehicle a predetermined amount in response to a collision.

III. Center Sensor Bracket

FIG. 2 is an enlarged perspective view of the sensor bracket 400 of FIG. 1. The present embodiment of the sensor bracket 400 can be configured as a central energy absorber disposed substantially at a central or intermediate portion of the bumper assembly 100 between the bumper beam assembly 200 and the sensor beam 340. The sensor bracket 400 thereby is attached to and spans between adjacent portions of the bumper beam assembly 200 and the beam 340.

The sensor bracket 400 can have a main bracket body 410 defined by a bracket first section 420 and a bracket second section 440. The bracket first section 420 can be connected to a beam 240 of the bumper beam assembly 200 while the bracket second section 440 can be connected to the beam 340 of the sensor bracket assembly 300. The bracket first section 420 and the bracket second section 440 can be unitarily formed such that the bracket first section 420 and the bracket second section 440 comprise a single bracket piece. Other embodiments of the main bracket body 410 can include the bracket first section 420 and the bracket second section 440 formed as separate pieces joined together. The main bracket body 410 of the present embodiment can be formed of aluminum, however other embodiments may be formed of any other suitable material such as other metals, alloys, plastics, resins, etc. The main bracket body 410 of the present embodiment can be extruded, however other embodiments may be formed by any other suitable method such as thermos-forming, blow-molding, etc.

Figure 6:
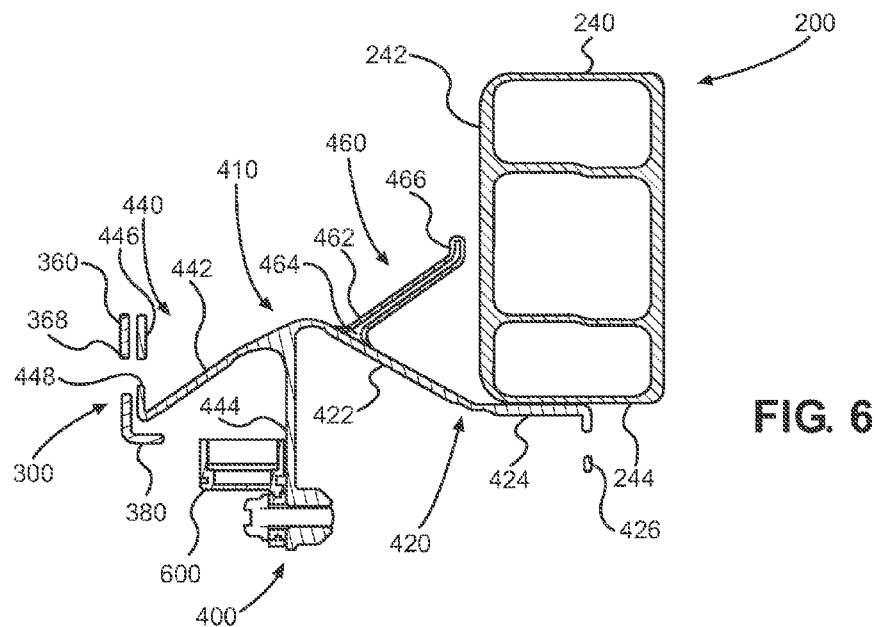
FIG. 6 is an enlarged cross-section view A-A of one of the sensor brackets of FIG. 5.

The bracket first section 420 can include a planar end portion 424 that is configured to be connected to a beam bottom surface 244 of the beam 240, as shown in FIG. 6. The end portion 424 of the present embodiment can be welded to the beam bottom surface 244, however other embodiments may include the end portion 424 connected to the beam bottom surface 244 by any other suitable connection method such as mechanical fasteners, adhesives, etc. The bracket first section 420 can also include an intermediate portion 422 extending from the end portion 424 towards the bracket second section 440, the intermediate portion 422 being a portion of the bracket first section 420 to which the bracket second section 440 is joined. The intermediate portion 422 and the end portion 424 can both be planar and angled relative to one another. The bracket first section 420 can also include a flange portion 426 extending downward from a terminating end of the end portion 424 opposite the intermediate portion 422. The flange portion 426 can include a hole extending therethrough.

The bracket second section 440 can include a flange portion 446 that is configured to be connected to a rear surface of a beam front side 360 of the beam 340, as shown in FIG. 6. The beam front side 360 can have a beam bottom surface 380 of the beam 340 extending therefrom. The flange portion 446 of the present embodiment can be welded to the rear surface of the beam front side 360 of the beam 340, however other embodiments may include the flange portion 446 connected to rear surface of the beam front side 360 by any other suitable connection method such as mechanical fasteners, adhesives, etc. The flange portion 446 of the present embodiment can include a flange hole 448 that may be used with manufacturing jigs to properly align the bracket second section 440, such as during welding. The bracket second section 440 can also include an intermediate portion 442 extending from the flange portion 446 towards the bracket first section 420, the intermediate portion 442 being a portion of the bracket second section 440 to which the bracket first section 420 is joined. The intermediate portion 442 and the flange portion 446 can both be planar and angled relative to one another. The bracket second section 440 can also include a lower portion 444 extending downward from the intermediate portion 442 at the portion joined to the bracket first section 420. The lower portion 444 can include holes extending therethrough and may be substantially parallel to the flange portion 446 of the bracket second section 440 and the flange portion 426 of the bracket first section 420.

As shown in more detail in the cross-section of FIG. 6, the bracket first section 420 and the bracket second section 440 can be joined to form a peak therebetween. The bracket first section 420 and the bracket second section 440 can thereby be angled downward from the peak.

The sensor bracket 400 of the present embodiment can also include a bracket spacer section 460 connected to the main bracket body 410. Specifically, the bracket spacer section 460 can project from the bracket first section 420 proximate the peak formed between the bracket first section 420 and the bracket second section 440 described above. The bracket spacer section 460 can be connected to the bracket first section 420 by a connecting portion 464 and include a planar intermediate portion 462 that is configured to extend towards but be spaced from the beam front surface 242 of the beam 240. The bracket spacer section 460 can extend upward at an angle from the downward angled bracket first section 420. Specifically, the bracket spacer section 460 can include an end portion 466 disposed at a terminating end of the bracket spacer section 460 proximate the beam front surface 242 of the beam 240. As shown in in more detail in FIG. 6, a gap is formed between the end portion 466 of the bracket spacer section 460 and the beam front surface 242 of the beam 240, the gap configured to close during a collision event, as described below. In the event of a collision or impact, the end portion 466 can be configured to slide upwards along the beam front surface 242. The end portion 466 of the bracket spacer section 460 can therefore be configured as a foot for being slidable along the beam front surface 242.

IV. Intermediate Sensor Bracket

FIG. 3 is an enlarged perspective view of another of the sensor brackets of FIG. 1. The present embodiment of the sensor bracket 500 can be configured as an outer energy absorber disposed substantially at a side portion of the bumper assembly 100 between the bumper beam assembly 200 and the beam 340. The sensor bracket 500 thereby is attached to and spans between adjacent portions of the bumper beam assembly 200 and the beam 340.

The sensor bracket 500 can have a main bracket body 510 defined by a bracket first section 520 and a bracket second section 540. The bracket first section 520 can be connected to the beam 240 of the bumper beam assembly 200 while the bracket second section 540 can be connected to the beam 340. The bracket first section 520 and the bracket second section 540 can be unitarily formed such that the bracket first section 520 and the bracket second section 540 comprise a single bracket piece. Other embodiments of the main bracket body 510 can include the bracket first section 520 and the bracket second section 540 formed as separate pieces joined together. The main bracket body 510 of the present embodiment can be formed of aluminum, however other embodiments may be formed of any other suitable material such as other metals, alloys, plastics, resins, etc. The main bracket body 510 of the present embodiment can be extruded, however other embodiments may be formed by any other suitable method such as thermos-forming, blow-molding, etc.

Figure 7:
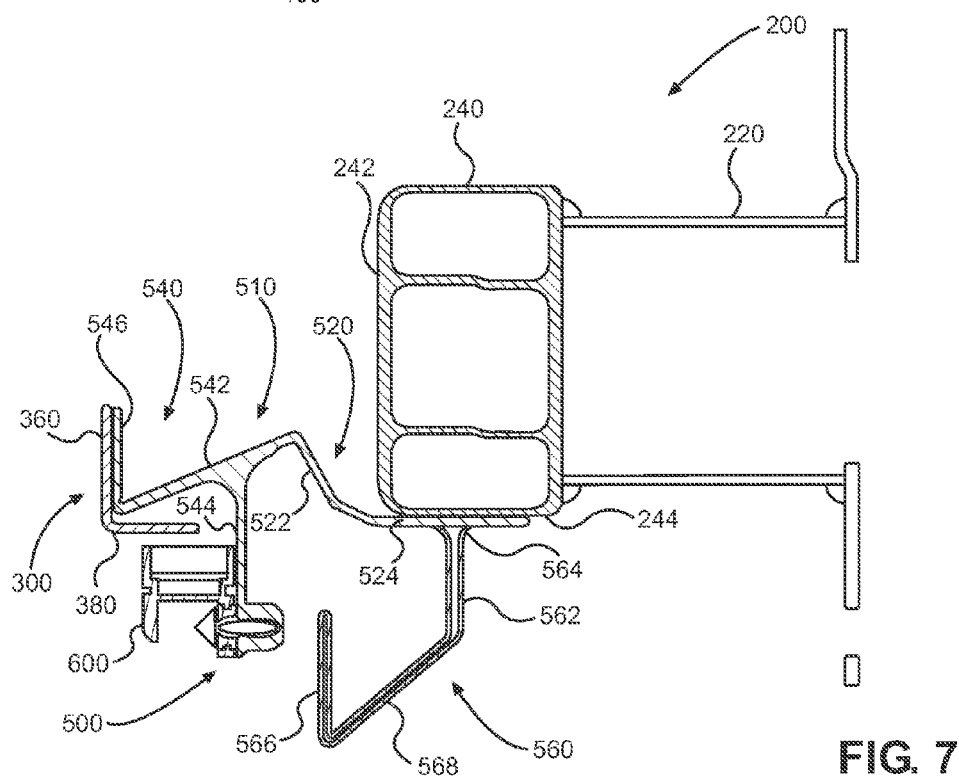
FIG. 7 is an enlarged cross-section view B-B of another of the sensor brackets of FIG. 5.

The bracket first section 520 can include a planar end portion 524 that is configured to be connected to the beam bottom surface 244 of the beam 240, as shown in FIG. 7. The end portion 524 of the present embodiment can be welded to the beam bottom surface 244, however other embodiments may include the end portion 524 connected to the beam bottom surface 244 by any other suitable connection method such as mechanical fasteners, adhesives, etc. The bracket first section 520 can also include an intermediate portion 522 extending from the end portion 524 towards the bracket second section 540, the intermediate portion 522 being a portion of the bracket first section 520 to which the bracket second section 540 is joined. The intermediate portion 522 and the end portion 524 can both be planar and angled relative to one another.

The bracket second section 540 can include a flange portion 546 that is configured to be connected to a rear surface of a beam front side 360 of the beam 340, as shown in FIG. 7. The flange portion 546 of the present embodiment can be welded to the rear surface of the beam front side 360 of the beam 340, however other embodiments may include the flange portion 546 connected to rear surface of the beam front side 360 by any other suitable connection method such as mechanical fasteners, adhesives, etc. The flange portion 546 of the present embodiment can include a flange hole 548 that may be used with manufacturing jigs to properly align the bracket second section 540, such as during welding. The bracket second section 540 can also include an intermediate portion 542 extending from the flange portion 546 towards the bracket first section 520, the intermediate portion 542 being a portion of the bracket second section 540 to which the bracket first section 520 is joined. The intermediate portion 542 and the flange portion 546 can both be planar and angled relative to one another. The bracket second section 540 can also include a lower portion 544 extending downward from the intermediate portion 542 at the portion joined to the bracket first section 520. The lower portion 544 can include holes extending therethrough and may be substantially parallel to the flange portion 546 of the bracket second section 540 and the flange portion 526 of the bracket first section 520. The lower portion 544 can include a lower protrusion projecting rearward at a terminating end of the lower portion 544 opposite the intermediate portion 542. The lower protrusion on the lower portion 544 can be spaced from a second intermediate portion 566 of a bracket spacer section 560 so as to form a gap therebetween, as described below.

As shown in more detail in the cross-section of FIG. 7, the bracket first section 520 and the bracket second section 540 can be joined to form a peak therebetween. The bracket first section 520 and the bracket second section 540 can thereby be angled downward from the peak.

The sensor bracket 500 of the present embodiment can also include the bracket spacer section 560 connected to the main bracket body 510. Specifically, the bracket spacer section 560 can project from the bracket first section 520 proximate the peak formed between the bracket first section 520 and the bracket second section 540 described above. The bracket spacer section 560 can be connected to the bracket first section 520 by a connecting portion 564 and include a planar first intermediate portion 562 that is configured to extend downward from the end portion 524 of the bracket first section 520. With the end portion 524 connected to the beam bottom surface 244 of the beam 240, the first intermediate portion 562 of the bracket spacer section 560 is configured to extend downward from and substantially underneath the beam 240. The bracket spacer section 560 can extend downward at an angle from the downward angled bracket first section 520 so that the first intermediate portion 564 extends approximately parallel to both the lower portion 544 and the flange portion 546 of the bracket second section 540. The bracket spacer section 560 can also include a second intermediate portion 568 extending forward and downward at an angle from a lower end of the first intermediate portion 562. The second intermediate portion 568 can connected the first intermediate portion 562 to an end portion 566, thereby connecting the end portion 566 to the main bracket body 510. The end portion 566 can extend upward from an end of the second intermediate portion 568 opposite and parallel with the first intermediate portion 562. The end portion 566 can extend upward from the second intermediate portion 568 so that an upper terminating end of the end portion 566 is aligned with the lower protrusion of the lower portion 544. The terminating end of the end portion 566 can thereby be spaced from the lower protrusion of the lower portion 544 so as to form a gap therebetween, as described below.

Specifically, the terminating end of the end portion 566 disposed proximate the lower protrusion of the lower portion 544 can form a gap configured to close during a collision event, as described below. In the event of a collision or impact, the lower protrusion of the lower portion 544 can be configured to slide along the end portion 566. The lower protrusion of the lower portion 544 of the bracket second section 540 can therefore be configured as a foot for being slidable along the end portion 566 of the bracket spacer section 560.

V. Collision Stages

Figure 8:
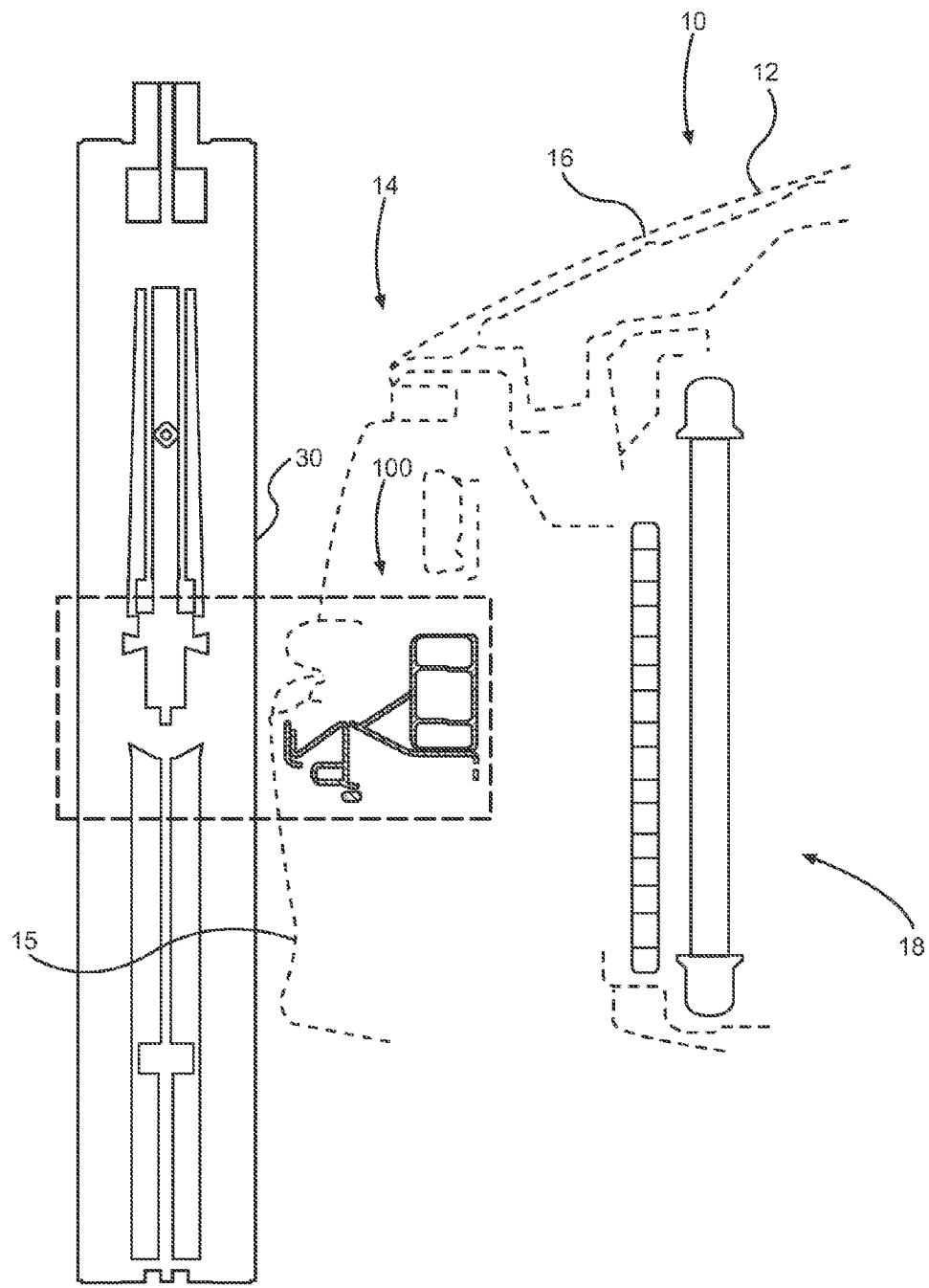
FIG. 8 is a cross-section view of the energy absorption system of the vehicle in contact with a collision object.

FIG. 8 is a cross-section view of the energy absorption system 100 of the vehicle 10 in contact with a collision object 30, the sensor bracket 400 being shown. The vehicle 10 can include a body 12, a front assembly 14, bumper skin 15, a hood 16 and a radiator 18. The bumper skin 15 can define an exterior surface of the front assembly 14 of the vehicle 10 separating the energy absorption system 100 from the collision object 30. The energy absorption system 100 of the exemplary vehicle 10 may be disposed ahead of the radiator 18, however other configurations of the front assembly 14 of the vehicle 10 have been considered and may incorporate other components and structural configurations. For exemplary purposes, the collision object 30 shown in FIGS. 8-12 can be a pedestrian's leg(s). However, the energy absorption system 100 can be configured to absorb energy from collisions with any and all objects not limited to pedestrians.

FIGS. 9-12 are cross-section views of the energy absorption system 100 of the vehicle 10 of FIG. 8 at ranging from a first position of contact with the collision object 30 to a fourth position. The first position through the fourth position are described and illustrated for exemplary purposes, and do not serve as the sole positions that the energy absorption system 100 and the collision object 30 may be in throughout an impact event.

Figure 9:
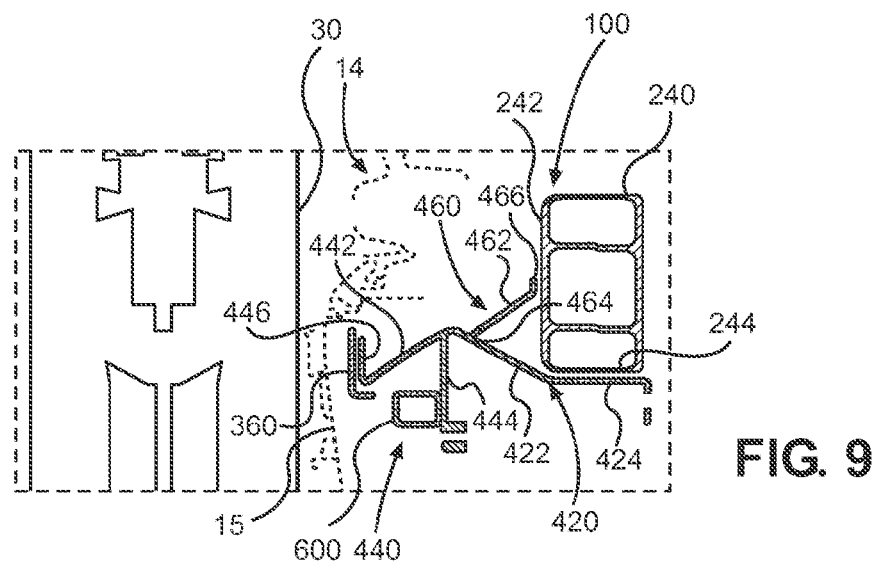
FIG. 9 is a cross-section view of the energy absorption system of the vehicle of FIG. 8 at a first position of contact with the collision object.

At a first position shown in FIG. 9, the collision object 30 is brought into contact with the bumper skin 15 of the front assembly 14. With just initial contact between the collision object 30 and the bumper skin 15 having occurred, the energy absorption system 100 has not been engaged yet.

Figure 10:
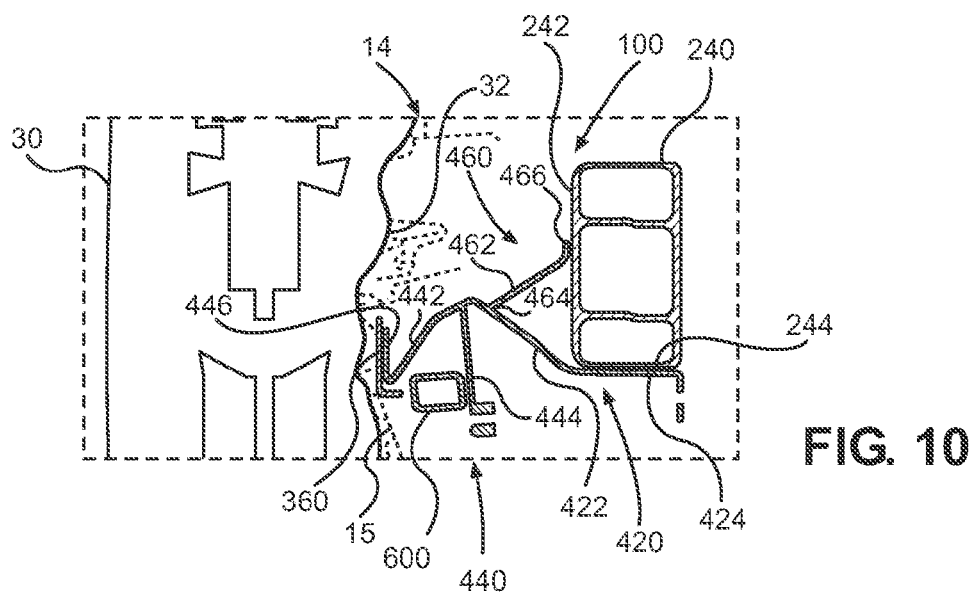
FIG. 10 is a cross-section view of the energy absorption system of the vehicle of FIG. 8 at a second position of contact with the collision object.

At a second position shown in FIG. 10, the collision object 30 is brought into further contact with the front assembly 14 as the collision object 30 moves further into the front assembly 14, deforming the bumper skin 15 and causing structural elements adjacent the bumper skin 15 to press against the energy absorption system 100. Force pressing against the energy absorption system 100 may deform the sensor brackets 400, 500 as described in detail below, and additionally may trigger the sensor 600 to pop the hood 16 up a predetermined amount to prepare for impact thereon by the collision object 30. Specifically, the main bracket body 410 of the sensor bracket 400 begins to deform as the adjacent structural elements press into the beam 340, which in turn presses into the bracket second section 440 of the main bracket body 410. The bracket second section 440 is joined to the bracket first section 420, which is connected to the bumper beam assembly 200. Because the bumper beam assembly 200 is a relatively rigid and reinforced structure of the energy absorption system 100, the bumper beam assembly 200 is substantially unmoving and does not deform in response to the collision object 30 pressing the beam 340 into the front assembly 14. Thus, as a distance between the collision object 30 and the bumper beam assembly 200 decreases, the bracket first section 420 and the bracket second section 440 of the main bracket body 410 deform as they are crushed between the collision object 30 and the bumper beam assembly 200. However, because the bracket spacer section 460 is spaced from the beam front surface 242 of the bumper beam assembly 200, the above described deformation of the connected main bracket body 410 does not cause similar deformation in the bracket spacer section 460. Instead, the end portion 466 of the bracket spacer section 460 is moved closer to the beam front surface 242 in accordance with the collision object 30 moving closer to the bumper beam assembly 200 and deforming the main bracket body 410. With the gap between the end portion 466 and the beam front surface 242 eliminated, the end portion 466 is brought into contact with the beam front surface 242. At this position, there is no more slack or gap for the bracket spacer section 460 to move through as the collision object 30 moves closer to the bumper beam assembly 200 and the main bracket body 410 continues to deform.

Figure 11:
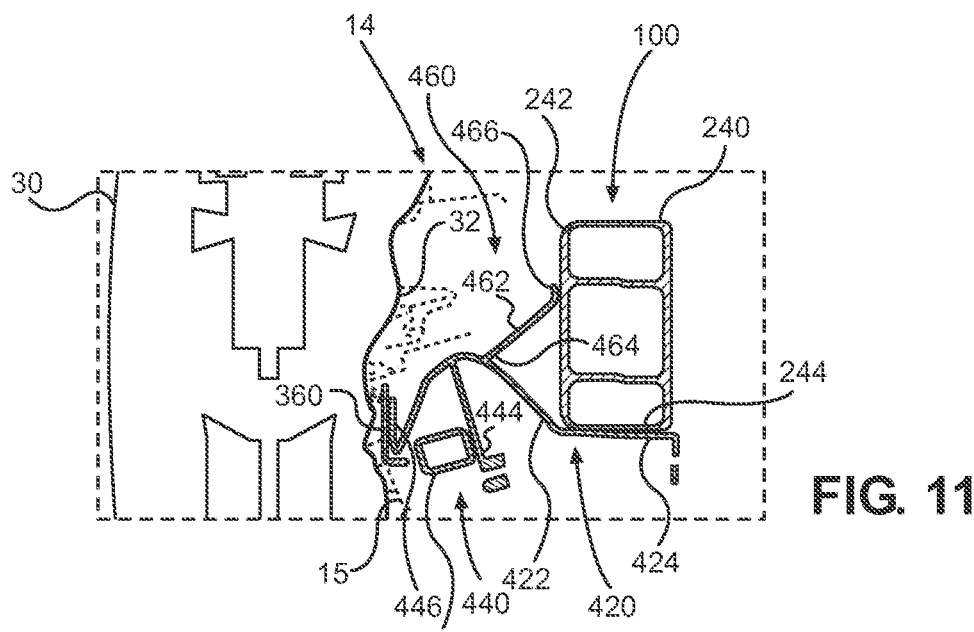
FIG. 11 is a cross-section view of the energy absorption system of the vehicle of FIG. 8 at a third position of contact with the collision object.

At a third position shown in FIG. 11, the collision object 30 is brought into even further contact with the front assembly 14 as the collision object 30 moves even further into the front assembly 14, further deforming the bumper skin 15 and further causing structural elements adjacent the bumper skin 15 to press against the energy absorption system 100. Specifically, the main bracket body 410 of the sensor bracket 400 continues to deform as the adjacent structural elements press into the beam 340, which in turn presses further into the bracket second section 440 of the main bracket body 410. A distance between the collision object 30 and the bumper beam assembly 200 continues to decrease, and the bracket first section 420 and the bracket second section 440 of the main bracket body 410 deform further as they are crushed between the collision object 30 and the bumper beam assembly 200. With the bracket spacer section 460 no longer spaced from the beam front surface 242 of the bumper beam assembly 200, the above described deformation of the connected main bracket body 410 starts to cause the bracket spacer section 460 to slide up the beam front surface 242 as the connecting portion 464 of the bracket spacer section 460 is brought closer to the beam front surface 242 as a result of the deformation of the main bracket body 410. Rather than deform, the end portion 466 of the bracket spacer section 460 is moved upward along the beam front surface 242 in accordance with the collision object 30 moving closer to the bumper beam assembly 200 and deforming the main bracket body 410. This contact between the bracket spacer section 460 and the beam front surface 242 serves as additional resistance to the collision object 30 pressing into the front assembly 14 of the vehicle 10. Because there is no more slack or gap between the bracket spacer section 460 and the beam front surface 242, additional movement of the collision object 30 towards the bumper beam assembly 200 continues to deform the main bracket body 410 and slide the bracket spacer section 460 up along the bream front surface 242.

Figure 12:
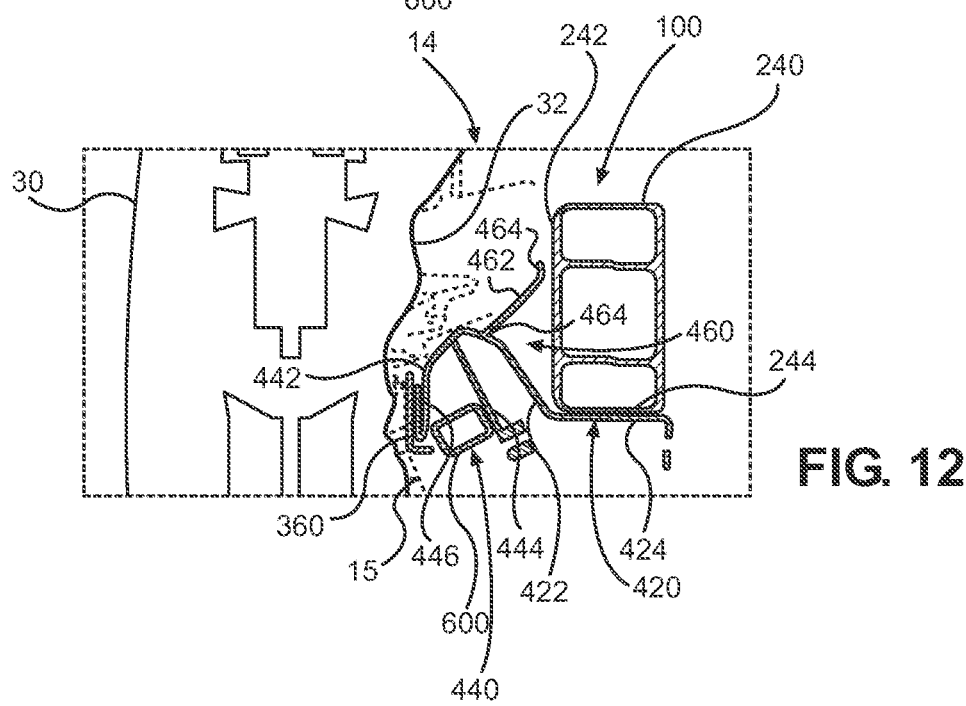
FIG. 12 is a cross-section view of the energy absorption system of the vehicle of FIG. 8 at a fourth position of contact with the collision object.

At a fourth position shown in FIG. 12, the collision object 30 is brought into yet further contact with the front assembly 14 as the collision object 30 moves yet further into the front assembly 14, further deforming the bumper skin 15 and further causing structural elements adjacent the bumper skin 15 to press against the energy absorption system 100. As described above in regards to the third position and FIG. 3, the main bracket body 410 of the sensor bracket 400 continues to deform as the adjacent structural elements press into the beam 340, which in turn presses further into the bracket second section 440 of the main bracket body 410. A distance between the collision object 30 and the bumper beam assembly 200 continues to decrease, and the bracket first section 420 and the bracket second section 440 of the main bracket body 410 deform further as they are crushed between the collision object 30 and the bumper beam assembly 200. With the bracket spacer section 460 in contact with the beam front surface 242 of the bumper beam assembly 200, the bracket spacer section 460 continues to slide up the beam front surface 242 as the connecting portion 464 of the bracket spacer section 460 is brought closer to the beam front surface 242 as a result of the deformation of the main bracket body 410. The end portion 466 of the bracket spacer section 460 is moved further upward along the beam front surface 242 in accordance with the collision object 30 moving closer to the bumper beam assembly 200 and deforming the main bracket body 410. As described above, this contact between the bracket spacer section 460 and the beam front surface 242 serves as additional resistance to the collision object 30 pressing into the front assembly 14 of the vehicle 10. Additional movement of the collision object 30 towards the bumper beam assembly 200 continues to deform the main bracket body 410 and slide the bracket spacer section 460 up along the bream front surface 242.

Regarding the sensor bracket 500, the above described configuration and positions of the sensor bracket 400 in the collision event are similarly applicable. The main bracket body 510 similarly deforms, but instead of the bracket spacer section 460 moving closer to and up along the beam front surface 242, the lower protrusion of the lower portion 544 moves closer to and along the end portion 566. This configuration of the sensor bracket 500 thus allows for similar deformation of the main bracket body 510 as the collision object 30 moves closer to the bumper beam assembly 200 while the lower protrusion of the lower portion 544 moves through the gap defined between the lower protrusion of the lower portion 544 into contact with end portion 566 of the bracket spacer section 560, followed by the lower protrusion of the lower portion 544 contacting the end portion 566 and moving along it.

In both the sensor brackets 400,500, the respective gaps are initially defined between a secondary plate portion configured as the bracket spacer section 460,560 extending from a main portion configured as a main bracket body 410,510 of the absorber. These gaps provide for a 2-stage response of the absorber under loading applied to the sensor brackets 400,500. In a first stage (prior to closure of the gap), the main portion of the absorber is deformed. Following closure of the gap, continued deformation of the absorber results in deflection of the secondary plate portion.

Figure 13:
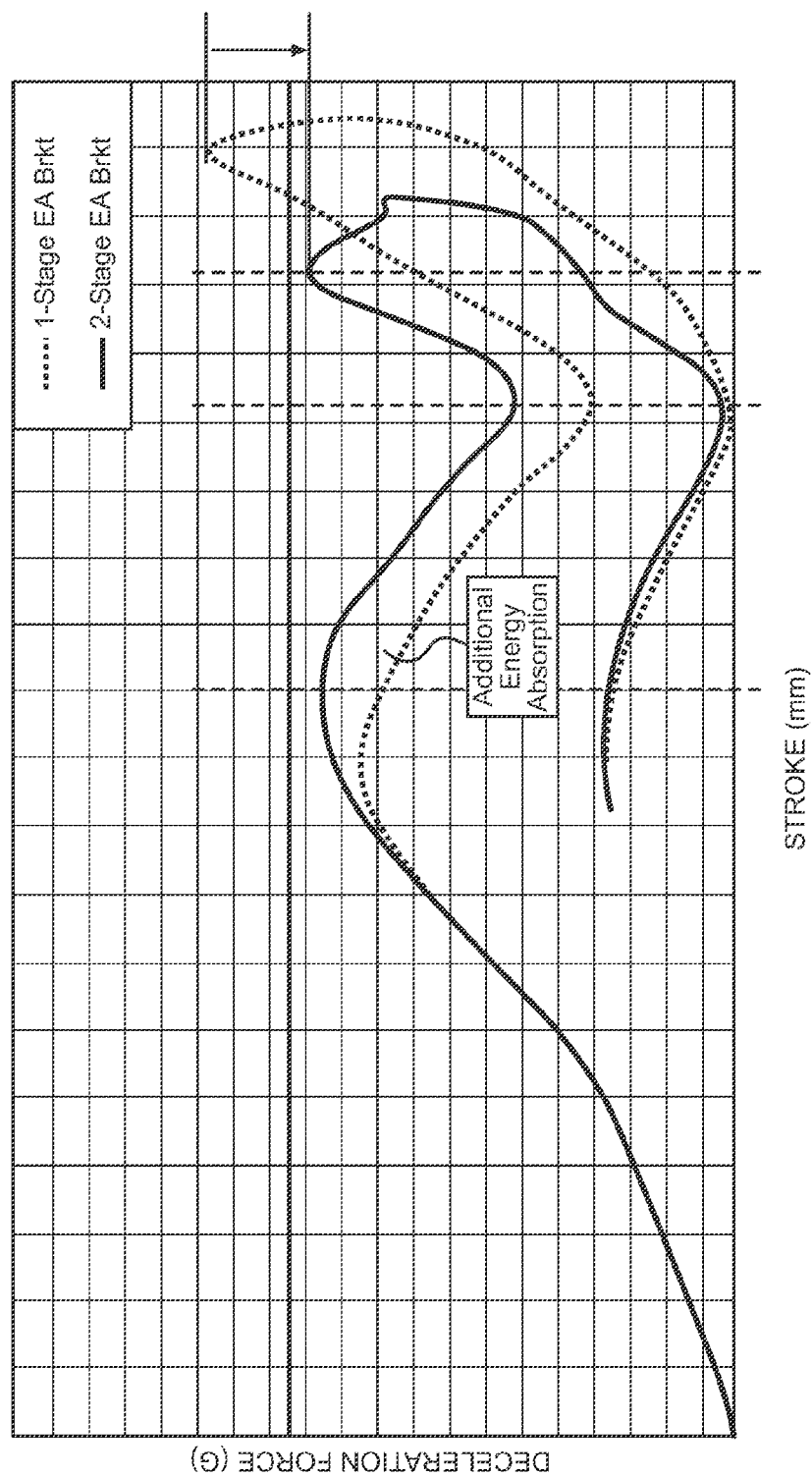
FIG. 13 is a graph of impact deceleration versus impact stroke of a collision object with the exemplary bumper assembly.

FIG. 13 is a graph of impact deceleration versus impact stroke of the collision object 30 with the exemplary bumper assembly 100. Specifically, the present embodiment of the disclosed 2-Stage EA Brkt is shown in comparison to a 1-Stage EA Brkt to illustrate the less volatile progression and lower peak of the deceleration forces (Gs) on the collision object 30 relative to collision stroke (mm).

VI. Alternative Embodiment of the Energy Absorption System

Figure 14:
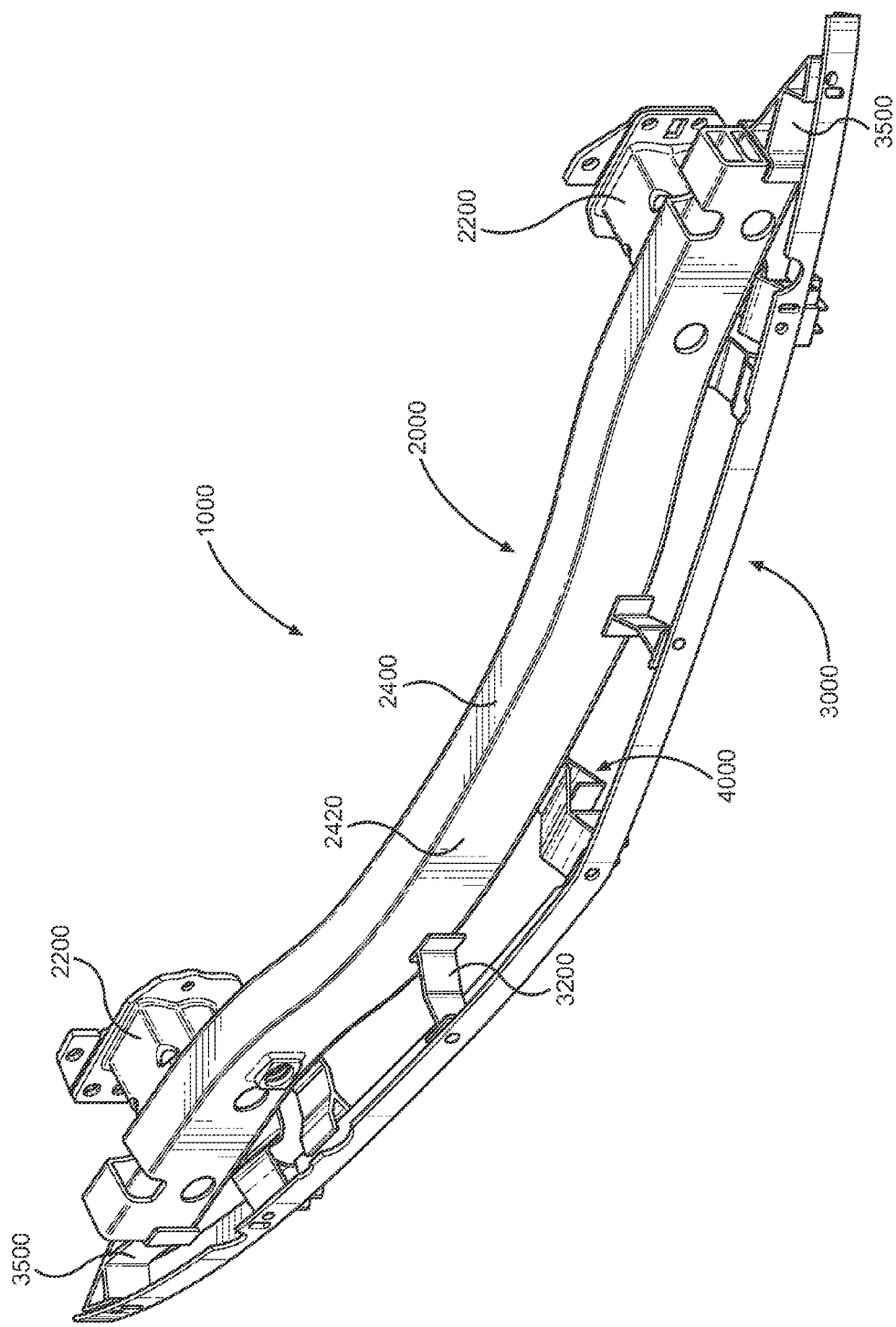
FIG. 14 is a perspective view of an exemplary energy absorption system of a vehicle in accordance with the disclosed subject matter including sensor brackets.

FIGS. 14, 18 and 19 are perspective views of an alternative embodiment of an energy absorption system 1000 of a vehicle in accordance with the disclosed subject matter including sensor brackets 4000,5000. The exemplary energy absorption system 1000 can include a bumper beam assembly 2000 with a pair of crush cans 2200 configured for mounting to a vehicle as a main bumper beam with a sensor bracket assembly 3000 extending along and in front of the bumper beam assembly 2000. The sensor bracket assembly 3000 can include an elongated beam (sensor beam) 3400, a pair of intermediate support brackets 3200 at two intermediate locations and a pair of end support brackets 3500 at opposing ends thereof for connecting to the bumper beam assembly 2000. The sensor bracket assembly 3000 can also include energy absorbing devices configured as the sensor brackets 4000,5000 extending between the beam 3400 and the bumper beam assembly 2000. Specifically, the sensor brackets 4000,5000 of the present embodiment can be secured to a beam bottom surface 2440 of the bumper beam assembly 2000. However, other embodiments of the energy absorption system 1000 can include the sensor brackets 4000,5000 secured to other surfaces of the bumper beam assembly 2000, or alternatively to other structures altogether.

The present embodiment shown in FIGS. 14, 18 and 19 includes three of the aforementioned energy absorbing devices in a configuration of one sensor bracket 4000 disposed at a substantially central portion of the energy absorption system 1000 between the bumper beam assembly 2000 and the beam 3400, and a pair of the sensor brackets 5000 on either side of the sensor bracket 4000 at intermediate portions of the energy absorption system 1000. However, other embodiments can include any number and configuration of the sensor brackets 4000,5000, such as one of each bracket structure, two of each bracket structure, two of the sensor brackets 4000 and one sensor bracket 5000, etc.

The present embodiment of the energy absorption system 1000 also includes a pair of spacer brackets 7000 extending from the bumper beam assembly 2000 toward the beam 3400. Specifically, the spacer brackets 7000 of the present embodiment can be secured to a beam bottom surface 2440 of the bumper beam assembly 2000. However, other embodiments of the energy absorption system 1000 can include the spacer brackets 7000 secured to other surfaces of the bumper beam assembly 2000, or alternatively to other structures altogether.

The present embodiment shown in FIGS. 14, 18 and 19 includes two of the aforementioned spacer brackets 7000 in a configuration of one of the spacer brackets 7000 disposed on either side of the sensor bracket 4000 at the central portion of the energy absorption system 1000 between the bumper beam assembly 2000 and the beam 3400. The spacer brackets 7000 are at intermediate portions of the energy absorption system 1000 proximate the respective sensor brackets 4000. However, other embodiments can include any number and configuration of the spacer brackets 7000, such as one, two, three, four, etc. disposed at various positions between the bumper beam assembly 2000 and the beam 3400.

The energy absorption system 100 can include one or more sensors 6000, shown in FIGS. 14-16, 18 and 20-21, integrated therein to detect at least collisions of foreign objects such as pedestrians with the energy absorption system 1000. In some embodiments, the sensor(s) 6000 may detect contact with the energy absorption system 1000. As will be described below, the sensor(s) 6000 may function in concert with other vehicle systems such as a hood pop up system that raises a hood of a vehicle a predetermined amount in response to a collision.

VII. Alternative Embodiment of the Center Sensor Bracket

Figure 15:
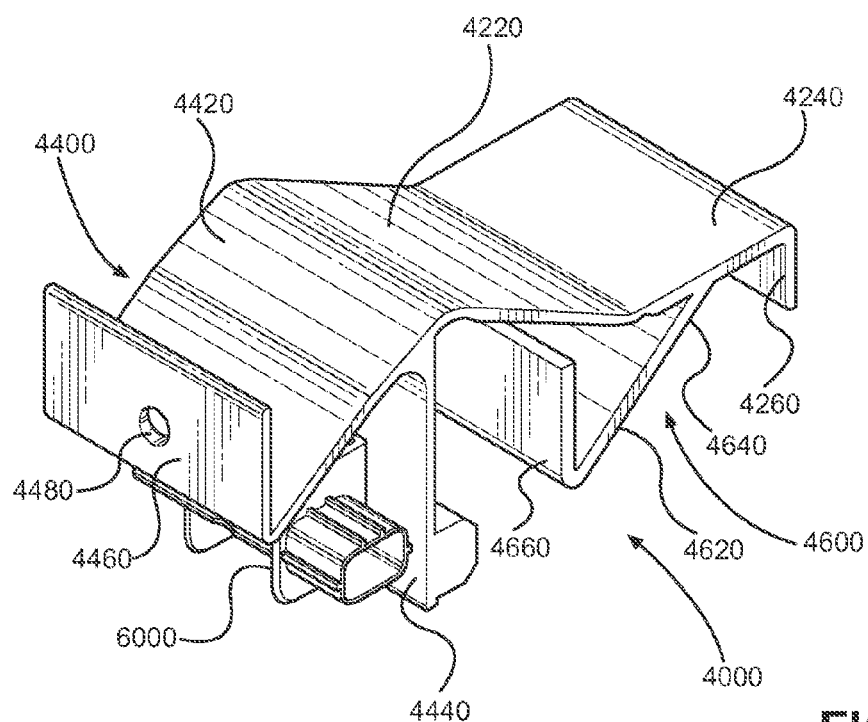
FIG. 15 is an enlarged perspective view of one of the sensor brackets of FIG. 14.

FIG. 15 is an enlarged perspective view of the sensor bracket 4000 of FIG. 14. The present embodiment of the sensor bracket 4000 can be configured as a central energy absorber disposed substantially at a central or intermediate portion of the bumper assembly 1000 between the bumper beam assembly 2000 and the sensor beam 3400. The sensor bracket 4000 thereby is attached to and spans between adjacent portions of the bumper beam assembly 2000 and the beam 3400.

The sensor bracket 4000 can have a main bracket body 4100 defined by a bracket first section 4200 and a bracket second section 4400. The bracket first section 4200 can be connected to a beam 2400 of the bumper beam assembly 2000 while the bracket second section 4400 can be connected to the beam 3400 of the sensor bracket assembly 3000. The bracket first section 4200 and the bracket second section 4400 can be unitarily formed such that the bracket first section 4200 and the bracket second section 4400 comprise a single bracket piece. Other embodiments of the main bracket body 4100 can include the bracket first section 4200 and the bracket second section 4400 formed as separate pieces joined together. The main bracket body 4100 of the present embodiment can be formed of aluminum, however other embodiments may be formed of any other suitable material such as other metals, alloys, plastics, resins, etc. The main bracket body 4100 of the present embodiment can be extruded, however other embodiments may be formed by any other suitable method such as thermos-forming, blow-molding, etc.

The bracket first section 4200 can include a planar end portion 4240 that is configured to be connected to a beam bottom surface 2440 of the beam 2400, as shown in FIG. 20. The end portion 4240 of the present embodiment can be welded to the beam bottom surface 2440, however other embodiments may include the end portion 4240 connected to the beam bottom surface 2440 by any other suitable connection method such as mechanical fasteners, adhesives, etc. The bracket first section 4200 can also include an intermediate portion 4220 extending from the end portion 4240 towards the bracket second section 4400, the intermediate portion 4220 being a portion of the bracket first section 4200 to which the bracket second section 4400 is joined. The intermediate portion 4220 and the end portion 4240 can both be planar and angled relative to one another. The bracket first section 4200 can also include a flange portion 4260 extending downward from a terminating end of the end portion 4240 opposite the intermediate portion 4220. The flange portion 4260 can include a hole extending therethrough.

The bracket second section 4400 can include a flange portion 4460 that is configured to be connected to a rear surface of a beam front side 3600 of the beam 3400, as shown in FIG. 20. The beam front side 3600 can have a beam bottom surface 3800 of the beam 3400 extending therefrom. The flange portion 4460 of the present embodiment can be welded to the rear surface of the beam front side 3600 of the beam 3400, however other embodiments may include the flange portion 4460 connected to rear surface of the beam front side 3600 by any other suitable connection method such as mechanical fasteners, adhesives, etc.

The flange portion 4460 of the present embodiment can include a flange hole 4480 that may be used with manufacturing jigs to properly align the bracket second section 4400, such as during welding. The bracket second section 4400 can also include an intermediate portion 4420 extending from the flange portion 4460 towards the bracket first section 4200, the intermediate portion 4420 being a portion of the bracket second section 4400 to which the bracket first section 4200 is joined. The intermediate portion 4420 and the flange portion 4460 can both be planar and angled relative to one another. The bracket second section 4400 can also include a lower portion 4440 extending downward from the intermediate portion 4420 at the portion joined to the bracket first section 4200. The lower portion 4440 can include holes extending therethrough and may be substantially parallel to the flange portion 4460 of the bracket second section 4400 and the flange portion 4260 of the bracket first section 4200. The lower portion 4440 can include a lower protrusion projecting rearward at a terminating end of the lower portion 4440 opposite the intermediate portion 4420. The lower protrusion on the lower portion 4440 can be spaced from a second intermediate portion 4660 of a bracket spacer section 4600 so as to form a gap therebetween, as described below.

As shown in more detail in the cross-section of FIG. 20, the bracket first section 4200 and the bracket second section 4400 can be joined to form a peak therebetween. The bracket first section 4200 and the bracket second section 4400 can thereby be angled downward from the peak.

The sensor bracket 4000 of the present embodiment can also include the bracket spacer section 4600 connected to the main bracket body 4100. Specifically, the bracket spacer section 4600 can project from the bracket first section 4200 at the end portion 4240. The bracket spacer section 4600 can be connected to the bracket first section 4200 by a connecting portion 4640 and include a planar intermediate portion 4620 that is configured to extend downward and forward from the end portion 4240 of the bracket first section 4200. With the end portion 4240 connected to the beam bottom surface 2440 of the beam 2400, the intermediate portion 4620 of the bracket spacer section 4600 is configured to extend downward from and forward of the beam 2400 at an angle. The intermediate portion 4620 can connect the connecting portion 4640 to an end portion 4660, thereby connecting the end portion 4660 to the main bracket body 4100. The end portion 4660 can extend upward from an end of the intermediate portion 4620. The end portion 4660 can extend upward from the intermediate portion 4620 so that an upper terminating end of the end portion 4660 is aligned with the lower protrusion of the lower portion 4440. The terminating end of the end portion 4660 can thereby be spaced from the lower protrusion of the lower portion 4440 so as to form a gap therebetween, as described below.

Specifically, the terminating end of the end portion 4660 disposed proximate the lower protrusion of the lower portion 4440 can form a gap configured to close during a collision event, as described below. In the event of a collision or impact, the lower protrusion of the lower portion 4440 can be configured to slide along the end portion 4660. The lower protrusion of the lower portion 4440 of the bracket second section 4400 can therefore be configured as a foot for being slidable along the end portion 4660 of the bracket spacer section 4600.

VIII. Alternative Embodiment of the Intermediate Sensor Bracket

Figure 16:
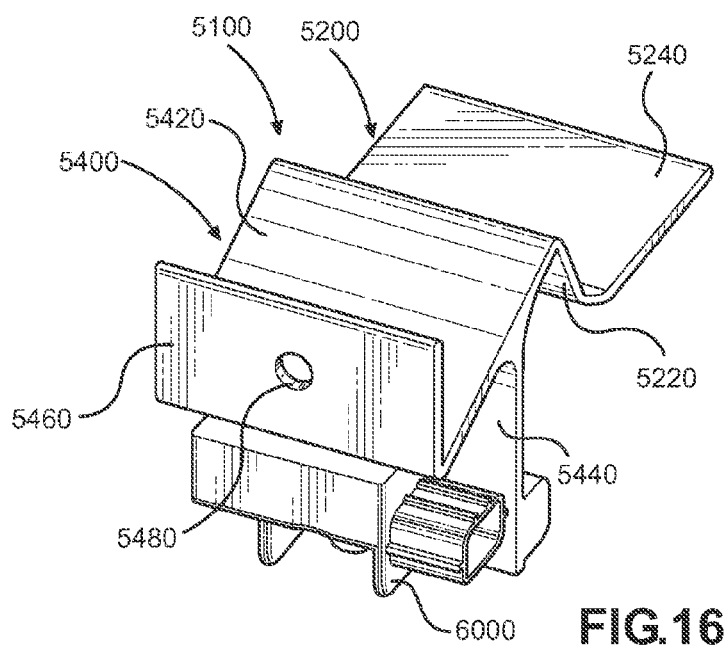
FIG. 16 is an enlarged perspective view of another of the sensor brackets of FIG. 14.

FIG. 16 is an enlarged perspective view of another of the sensor brackets of FIG. 14. The present embodiment of the sensor bracket 5000 can be configured as an outer energy absorber disposed substantially at a side portion of the bumper assembly 1000 between the bumper beam assembly 2000 and the beam 3400. The sensor bracket 5000 thereby is attached to and spans between adjacent portions of the bumper beam assembly 2000 and the beam 3400.

The sensor bracket 5000 can have a main bracket body 5100 defined by a bracket first section 5200 and a bracket second section 5400. The bracket first section 5200 can be connected to the beam 2400 of the bumper beam assembly 2000 while the bracket second section 5400 can be connected to the beam 3400. The bracket first section 5200 and the bracket second section 5400 can be unitarily formed such that the bracket first section 5200 and the bracket second section 5400 comprise a single bracket piece. Other embodiments of the main bracket body 5100 can include the bracket first section 5200 and the bracket second section 5400 formed as separate pieces joined together. The main bracket body 5100 of the present embodiment can be formed of aluminum, however other embodiments may be formed of any other suitable material such as other metals, alloys, plastics, resins, etc. The main bracket body 5100 of the present embodiment can be extruded, however other embodiments may be formed by any other suitable method such as thermos-forming, blow-molding, etc.

The bracket first section 5200 can include a planar end portion 5240 that is configured to be connected to the beam bottom surface 2440 of the beam 2400, as shown in FIG. 21. The end portion 5240 of the present embodiment can be welded to the beam bottom surface 2440, however other embodiments may include the end portion 5240 connected to the beam bottom surface 2440 by any other suitable connection method such as mechanical fasteners, adhesives, etc. The bracket first section 5200 can also include an intermediate portion 5220 extending from the end portion 5240 towards the bracket second section 5400, the intermediate portion 5220 being a portion of the bracket first section 5200 to which the bracket second section 5400 is joined. The intermediate portion 5220 and the end portion 5240 can both be planar and angled relative to one another.

The bracket second section 5400 can include a flange portion 5460 that is configured to be connected to a rear surface of a beam front side 3600 of the beam 3400, as shown in FIG. 21. The flange portion 5460 of the present embodiment can be welded to the rear surface of the beam front side 3600 of the beam 3400, however other embodiments may include the flange portion 5460 connected to rear surface of the beam front side 3600 by any other suitable connection method such as mechanical fasteners, adhesives, etc. The flange portion 5460 of the present embodiment can include a flange hole 5480 that may be used with manufacturing jigs to properly align the bracket second section 5400, such as during welding. The bracket second section 5400 can also include an intermediate portion 5420 extending from the flange portion 5460 towards the bracket first section 5200, the intermediate portion 5420 being a portion of the bracket second section 5400 to which the bracket first section 5200 is joined. The intermediate portion 5420 and the flange portion 5460 can both be planar and angled relative to one another. The bracket second section 5400 can also include a lower portion 5440 extending downward from the intermediate portion 5420 at the portion joined to the bracket first section 5200. The lower portion 5440 can include holes extending therethrough and may be substantially parallel to the flange portion 5460 of the bracket second section 5400 and the flange portion 5260 of the bracket first section 5200. The lower portion 5440 can include a lower protrusion projecting rearward at a terminating end of the lower portion 5440 opposite the intermediate portion 5420.

As shown in more detail in the cross-section of FIG. 21, the bracket first section 5200 and the bracket second section 5400 can be joined to form a peak therebetween. The bracket first section 5200 and the bracket second section 5400 can thereby be angled downward from the peak.

IX. Spacer Bracket

Figure 17:
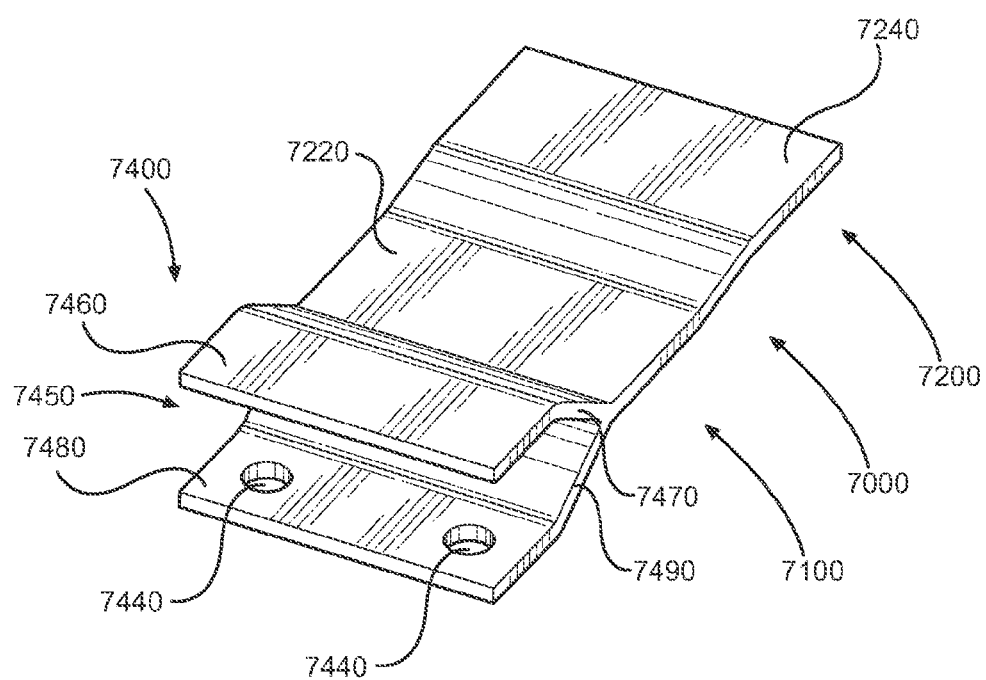
FIG. 17 is an enlarged perspective view of one of the spacer brackets of FIG. 14.

FIG. 17 is an enlarged perspective view of one of the spacer brackets 7000 of FIG. 14. The present embodiment of the spacer brackets 7000 can be disposed substantially at a side portion of the bumper assembly 1000 between the bumper beam assembly 2000 and the beam 3400 proximate the respective sensor brackets 5000. Each of the spacer brackets 7000 is thereby attached to and spans from portions of the bumper beam assembly 2000 toward adjacent portions of the beam 3400.

The spacer brackets 7000 can have a main bracket body 7100 defined by a bracket first section 7200 and a bracket second section 7400. The bracket first section 7200 can be connected to the beam 2400 of the bumper beam assembly 2000 while the bracket second section 7400 can extend toward the beam 3400. The bracket first section 7200 and the bracket second section 7400 can be unitarily formed such that the bracket first section 7200 and the bracket second section 7400 comprise a single bracket piece. Other embodiments of the main bracket body 7100 can include the bracket first section 7200 and the bracket second section 7400 formed as separate pieces joined together. The main bracket body 7100 of the present embodiment can be formed of aluminum, however other embodiments may be formed of any other suitable material such as other metals, alloys, plastics, resins, etc. The main bracket body 7100 of the present embodiment can be extruded, however other embodiments may be formed by any other suitable method such as thermos-forming, blow-molding, etc.

Figure 22:
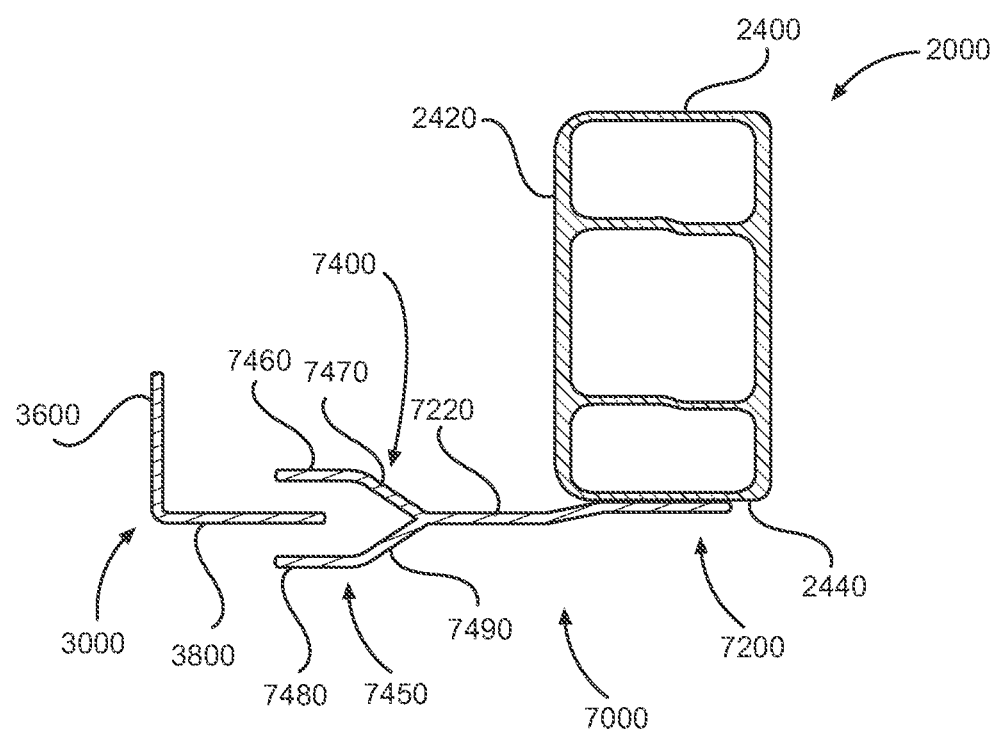
FIG. 22 is an enlarged cross-section view C-C of one of the spacer brackets of FIG. 19.

The bracket first section 7200 can include a planar end portion 7240 that is configured to be connected to the beam bottom surface 2440 of the beam 2400, as shown in FIG. 22. The end portion 7240 of the present embodiment can be welded to the beam bottom surface 2440, however other embodiments may include the end portion 7240 connected to the beam bottom surface 2440 by any other suitable connection method such as mechanical fasteners, adhesives, etc. The bracket first section 7200 can also include an intermediate portion 7220 extending from the end portion 7240 towards the bracket second section 7400, the intermediate portion 7220 being a portion of the bracket first section 7200 to which the bracket second section 7400 is joined. The intermediate portion 7220 and the end portion 7240 can both be planar and extend substantially parallel to one another.

The bracket second section 7400 can include a flange portion 7450 that is configured to engage to a rear end of a beam bottom surface 3800 of the beam 3400, as shown in FIG. 22. The flange portion 7450 of the present embodiment can be spaced from the rear end of the beam bottom surface 3800 of the beam 3400 so as to form a gap therebetween, as described below. The flange portion 7450 of the present embodiment can include a flange extensions 7460, 7480 extending from the intermediate portion 7220 by respective angled connecting extensions 7470, 7490. The flange extensions 7460, 7480 can be similarly dimensioned and extend substantially parallel to one another, constitute upper and lower extensions. An interior space of the flange portion 7450 is defined by interior surfaces of the flange extensions 7460, 7480 and the respective connecting extensions 7470, 7490 that are joined together at an intersection. The lower flange extension 7480 can include a pair of flange holes 7440 that may be used with manufacturing jigs to properly align the bracket second section 7400, such as during welding. The intermediate portion 7420 and the flange portion 5460 can both be planar relative to one another.

Specifically, the space formed between the flange extensions 7460, 7480 of the flange portion 7450 can form a gap with the rear end of the beam bottom surface 3800 configured to close during a collision event, as described below. In the event of a collision or impact, the rear end of the beam bottom surface 3800 can be configured to slide along the flange extensions 7460, 7480 and/or the respective connecting extensions 7470, 7490 until the gap is closed and the rear end of the beam bottom surface 3800 is disposed at the intersection of the flange extensions 7460, 7480.

X. Collision Stages

The collision stages of the aforementioned alternate embodiment of the energy absorption system 1000 are similar to those stages described with regard to the other embodiment of the energy absorption system 100 and shown in FIGS. 9-13. As the sensor brackets 4000, 5000 deform similarly to the sensor brackets 400, 500, the gap between the lower protrusion on the lower portion 4440 of the bracket second section 4400 and the end portion 4660 of the bracket spacer section 4600 closes until these components contact each other. Simultaneously, the gap between the interior space of the flange portion 7450 (i.e., the intersection of the connecting extensions 7470, 7490) and the rear end of the beam bottom surface 3800 closes until these components contact each other.

XI. Alternative Embodiments

While certain embodiments of the invention are described above, and FIGS. 1-13 disclose the best mode for practicing the various inventive aspects, it should be understood that the invention can be embodied and configured in many different ways without departing from the spirit and scope of the invention.

For example, embodiments are disclosed above in the context of the vehicle energy absorption system configured to be incorporated in a front bumper assembly of a vehicle, as described above. However, embodiments are intended to include or otherwise cover energy absorption systems configured for use with any type of bumper assembly.

As disclosed above, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

The vehicle can include any type of transmission, including an automatic transmission, a manual transmission, or a semi-automatic transmission. The transmission can include an input shaft, an output shaft, and a speed ratio assembly.

Embodiments are also intended to include or otherwise cover methods of using and methods of manufacturing any or all of the elements disclosed above. The methods of manufacturing include or otherwise cover processors and computer programs implemented by processors used to design various elements of the vehicle energy absorption system disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A sensor bracket assembly configured to extend between a sensor beam and a bumper beam of a vehicle, the sensor bracket assembly comprising:
   a bracket first section that is configured to be directly or indirectly connected to the bumper beam;
   a bracket second section that is configured to be directly or indirectly connected to the sensor beam; and
   a spacer section that projects from the bracket first section and is configured to extend towards but be spaced from one of the bracket second section and the bumper beam;
   wherein an end of the spacer section that is configured to extend towards but be spaced from the one of the bracket second section and the bumper beam includes a foot portion configured to contact and slide along the one of the bracket second section and the bumper beam.

2. The sensor bracket assembly of claim 1, wherein the bracket first section, the bracket second section, and the spacer section are unitary.

3. The sensor bracket assembly of claim 1, wherein the spacer section extends towards but is spaced from the bumper beam.

4. The sensor bracket assembly of claim 1, wherein the bracket first section is configured to be connected to a bottom surface of the bumper beam.

5. The sensor bracket assembly of claim 1, wherein the spacer section extends towards but is spaced from the bracket second section.

6. The sensor bracket assembly of claim 5, wherein the spacer section projects from a portion of the bracket first section that is configured to be connected to the bumper beam.

7. The sensor bracket assembly of claim 6, wherein the spacer section is substantially U-shaped with parallel sides connected by an intermediate portion.

8. A sensor bracket combination configured to extend between a sensor beam and a bumper beam of a vehicle, the sensor bracket combination comprising:
   a first bracket member including:
      a first bracket first section that is configured to be directly or indirectly connected to the bumper beam;
      a first bracket second section that is configured to be directly or indirectly connected to the sensor beam; and
      a first spacer section that projects from the first bracket first section and is configured to extend towards but be spaced from one of the first bracket second section and the bumper beam,
      wherein an end of the first spacer section that is configured to extend towards but be spaced from the one of the first bracket second section and the bumper beam includes a foot portion configured to contact and slide along the one of the first bracket second section and the bumper beam; and
   at least one second bracket member including:
      a second bracket first section that is configured to be directly or indirectly connected to the bumper beam; and
      a second bracket second section that is configured to be directly or indirectly connected to the sensor beam.

9. The sensor bracket combination of claim 8, wherein the at least one second bracket member includes a second spacer section that projects from the second bracket first section and extends towards but is spaced from the second bracket second section.

10. The sensor bracket combination of claim 8, wherein the first bracket first section and the first bracket second section are unitary, and the second bracket first section and the second bracket second section are unitary.

11. The sensor bracket combination of claim 8, wherein the first bracket first section and the second bracket first section are each configured to be connected to a bottom surface of the bumper beam.

12. The sensor bracket combination of claim 8, wherein the first spacer section is substantially U-shaped with parallel sides connected by an intermediate portion.

13. The sensor bracket combination of claim 8, wherein the first bracket member is configured to be connected to an intermediate portion of the bumper beam and the at least one second bracket member is configured to be connected to an end portion of the bumper beam spaced outward from the intermediate portion.

14. A sensor bracket combination configured to extend between a sensor beam and a bumper beam of a vehicle, the sensor bracket combination comprising:
   a first bracket member including:
      a first bracket first section that is configured to be directly or indirectly connected to the bumper beam;
      a first bracket second section that is configured to be directly or indirectly connected to the sensor beam; and
      a first spacer section that projects from the first bracket first section and is configured to extend towards but be spaced from one of the first bracket second section and the bumper beam,
      wherein an end of the first spacer section that is configured to extend towards but be spaced from the one of the first bracket second section and the bumper beam includes a foot portion configured to contact and slide along the one of the first bracket second section and the bumper beam;
   at least one second bracket member including:
      a second bracket first section that is configured to be directly or indirectly connected to the bumper beam; and
      a second bracket second section that is configured to be directly or indirectly connected to the sensor beam; and
   at least one third bracket member including:
      a third bracket first section that is configured to be directly or indirectly connected to the bumper beam; and
      a third bracket second section that projects from the third bracket first section and is configured to extend towards but be spaced from the sensor beam.

15. The sensor bracket combination of claim 14, wherein the third bracket second section of the at least one third bracket member includes upper and lower extensions that project above and below the sensor beam and define an interior space configured to receive the sensor beam therein.

16. The sensor bracket combination of claim 15, wherein the third bracket second section is C-shaped with the upper and lower extensions extending substantially parallel to each other.

17. The sensor bracket combination of claim 14, wherein the first bracket first section and the first bracket second section are unitary, the second bracket first section and the second bracket second section are unitary, and the third bracket first section and the third bracket second section are unitary.

18. The sensor bracket combination of claim 14, wherein the first bracket member is configured to be connected to a central portion of the bumper beam, the at least one second bracket member is configured to be connected to an end portion of the bumper beam spaced outward from the central portion, and the at least one third bracket member is configured to be connected to an intermediate portion of the bumper beam disposed between the central portion and the end portion.

19. The sensor bracket combination of claim 18, wherein the first bracket first section, the second bracket first section, and the third bracket first section are each configured to be connected to a bottom surface of the bumper beam.

* * * * *